US012026405B2

(12) United States Patent
Yamanaka et al.

(10) Patent No.: US 12,026,405 B2
(45) Date of Patent: Jul. 2, 2024

(54) PRINTING SYSTEM HAVING PRINTER WITH CHIP FOR GENERATING IMAGE DATA AND INFORMATION PROCESSING DEVICE FOR DIVIDING ORIGINAL IMAGE DATA FOR A LARGER NUMBER OF CHANNELS INTO GROUPS (71) Applicant: SEIKO EPSON CORPORATION, Tokyo (JP)

(72) Inventors: Shuichi Yamanaka, Matsumoto (JP); Fumio Tokutomi, Matsumoto (JP); Hiroki Okabe, Matsumoto (JP); Yuto Togawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/188,006

(22) Filed: Mar. 22, 2023

(65) Prior Publication Data
US 2023/0305762 A1 Sep. 28, 2023

(30) Foreign Application Priority Data
Mar. 24, 2022 (JP) ................. 2022-047712

(51) Int. Cl.
G06F 3/12 (2006.01)
H04N 1/64 (2006.01)

(52) U.S. Cl.
CPC .......... G06F 3/1206 (2013.01); G06F 3/1208 (2013.01); G06F 3/1255 (2013.01); H04N 1/648 (2013.01)

(58) Field of Classification Search
None
See application file for complete search history.

(56) References Cited

U.S. PATENT DOCUMENTS

| 11,573,752 | B1* | 2/2023 | Osada | G06F 3/1285 |
| 2011/0096985 | A1* | 4/2011 | Matsuhira | H04N 19/176 382/166 |
| 2014/0211222 | A1* | 7/2014 | Park | H04N 1/0096 358/1.9 |
| 2015/0114126 | A1* | 4/2015 | Matsuo | G01C 19/5607 73/504.16 |
| 2016/0232433 | A1* | 8/2016 | Azami | G06F 3/1285 |
| 2018/0131843 | A1 | 5/2018 | Kasuya | |

FOREIGN PATENT DOCUMENTS

JP 2018-075773 A 5/2018

* cited by examiner

Primary Examiner — Dung D Tran
(74) Attorney, Agent, or Firm — WORKMAN NYDEGGER (57) ABSTRACT An information processing device includes a processing unit configured to divide original image data for a larger number of channels Nb than the number of channels Na into a plurality of groups so that a number of channels of each of the groups becomes no larger than the number of channels Na, generate compressed image data for the Na channels according to the processing unit from the original image data included in each of the groups, and generate the print command including the compressed image data for the Na channels corresponding to each of the groups, and a communication unit configured to transmit the print command to the printer.

8 Claims, 7 Drawing Sheets

PRINTING SYSTEM HAVING PRINTER WITH CHIP FOR GENERATING IMAGE DATA AND INFORMATION PROCESSING DEVICE FOR DIVIDING ORIGINAL IMAGE DATA FOR A LARGER NUMBER OF CHANNELS INTO GROUPS

The present application is based on, and claims priority from JP Application Serial Number 2022-047712, filed Mar. 24, 2022, the disclosure of which is hereby incorporated by reference herein in its entirety.

BACKGROUND

1. Technical Field

The present disclosure relates to an information processing device to be coupled to a printer provided with a chip which processes compressed image data by a processing unit of a predetermined number of channels, a non-transitory computer-readable storage medium storing a print control program, a printing system, and a printer.

2. Related Art

As a printer, there is known a color printer which uses color materials of C, M, Y, and K constituting process colors to thereby print a color image on a recording medium. Here, the character C means cyan, the character M means magenta, the character Y means yellow, and the character K means black. In order to realize high-speed color printing with as inexpensive configuration as possible, the color printer executes predetermined processing such as extraction on the compressed image data with the four channels corresponding to C, M, Y, and K with a chip, and then prints a color image based on image data thus obtained. An information processing device to be coupled to the color printer compresses original image data with 4 channels corresponding to C, M, Y, and K to thereby generate the compressed image data, then generates a print command including the compressed image data, and then transmits the print command to the color printer.

As a reference, an image forming device disclosed in JP-A-2018-75773 is capable of compressing the image data of the 4 channels of CMYK at the same time, and is capable of decompressing the image data of the 4 channels of CMYK at the same time.

The technology described above cannot handle the image data exceeding 4 channels unless the circuit configuration of the chip mass-produced is changed. Changing the circuit configuration of the chip consumes a lot of time and money. Therefore, it is desired to handle the image data with the number of channels which fails to fall within the processing unit of the chip.

SUMMARY

An information processing device according to the present disclosure is an information processing device to be coupled to a printer which is provided with a chip configured to generate image data to be printed by a processing unit of Na channels from compressed image data for the Na channels included in a print command defining the number of channels Na as an integer no smaller than 2, and has an aspect of including a processing unit configured to divide original image data for a larger number of channels Nb than the number of channels Na into a plurality of groups so that a number of channels of each of the groups becomes no larger than the number of channels Na, generate compressed image data for the Na channels according to the processing unit from the original image data included in each of the groups, and generate the print command including the compressed image data for the Na channels corresponding to each of the groups, and a communication unit configured to transmit the print command to the printer.

Further, a non-transitory computer-readable storage medium storing a print control program according to the present disclosure is a non-transitory computer-readable storage medium storing a print control program configured to transmit a print command to a printer provided with a chip configured to generate image data to be printed by a processing unit of Na channels from compressed image data for the Na channels included in the print command defining a number of channels Na as an integer no smaller than 2, and has an aspect of making a computer realize functions including a compressed image data generation function of dividing original image data for a larger number of channels Nb than the number of channels Na into a plurality of groups so that a number of channels of each of the groups becomes no larger than the number of channels Na to generate compressed image data for the Na channels according to the processing unit from the original image data included in each of the groups, and a print command generation function of generating the print command including the compressed image data for the Na channels corresponding to each of the groups.

Further, a printing system according to the present disclosure is a printing system having an aspect of including a printer, and an information processing device, wherein the printer includes a receiver configured to receive a print command, a chip configured to perform predetermined processing of generating image data to be printed by a processing unit of Na channels from compressed image data for the Na channels defining the number of channels Na as an integer no smaller than 2, and a print controller configured to make the chip perform the predetermined processing on the compressed image data for the Na channels corresponding to each of the plurality of groups included in the print command to execute printing based on the image data obtained, and the information processing device includes a processing unit configured to divide original image data for a larger number of channels Nb than the number of channels Na into the plurality of groups so that a number of channels of each of the groups becomes no larger than the number of channels Na, generate the compressed image data for the Na channels according to the processing unit from the original image data included in each of the groups, and generate the print command including the compressed image data for the Na channels corresponding to each of the groups, and a communication unit configured to transmit the print command to the printer.

Further, a printer according to the present disclosure is a printer to be coupled to an information processing device configured to transmit a print command including compressed image data for Na channels corresponding to each of a plurality of groups divided so that a number of channels Nb larger than the number of channels Na becomes no larger than the number of channels Na defining the number of channels Na as an integer no smaller than 2, and has an aspect of including a receiver configured to receive the print command, a chip configured to perform predetermined processing of generating image data to be printed by a processing unit of the Na channels from the compressed image data for the Na channels, and a print controller configured to make the chip perform the predetermined processing on the compressed image data for the Na channels corresponding to each of the plurality of groups included in the print command to execute printing based on the image data obtained.

DESCRIPTION OF AN EXEMPLARY EMBODIMENT

An embodiment of the present disclosure will hereinafter be described. Obviously, the following embodiment is nothing more than an illustration of the present disclosure, and all of the features shown in the embodiment are not necessarily essential for means for the solution of the present disclosure.

(1) OUTLINE OF TECHNOLOGY INCLUDED IN PRESENT DISCLOSURE

First, an outline of the technology included in the present disclosure will be described with reference to an example shown in FIG. 1 through FIG. 7. It should be noted that the drawings in the present application are each a diagram schematically showing an example, magnification rates in respective directions shown in these diagrams are different from each other in some cases, and the diagrams fail to match each other in some cases. Obviously, each of the elements of the present technology is not limited to a specific example denoted by a reference symbol. In the "Outline of Technology Included in Present Disclosure," words in parentheses each mean a supplemental explanation of the word immediately before the parenthesis.

Aspect 1

Figure 1:
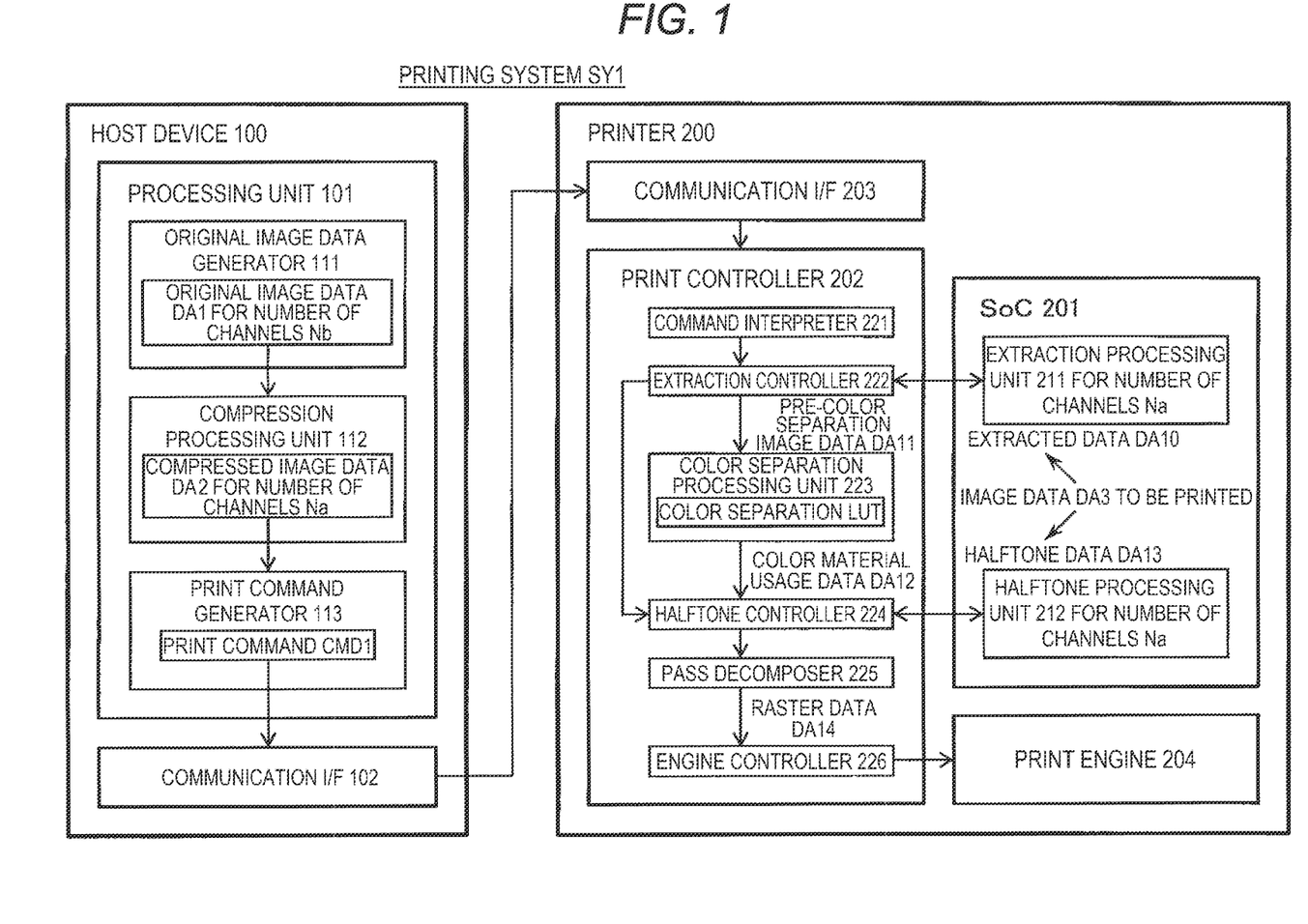
FIG. 1 is a block diagram schematically showing a configuration example of a printing system including an information processing device and a printer.
Figure 3:
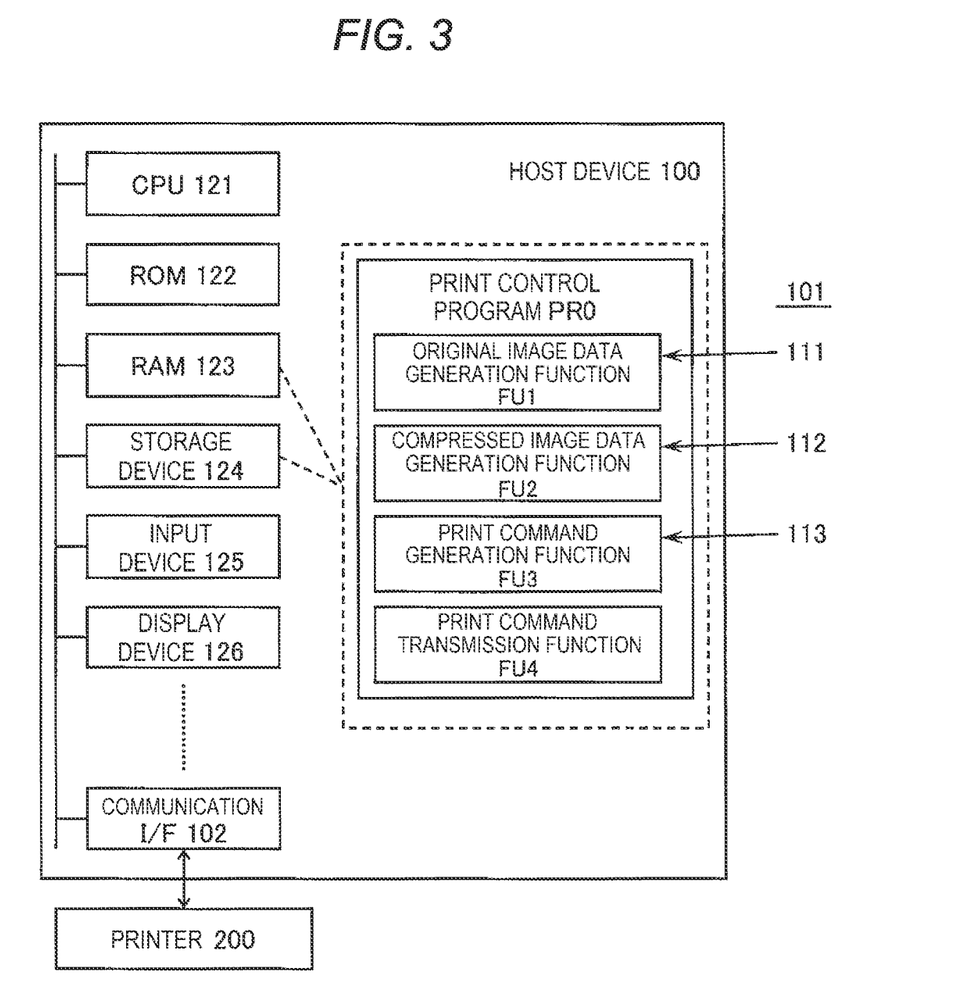
FIG. 3 is a block diagram schematically showing a configuration example of the information processing device.

An information processing device (100) according to an aspect of the present technology is an information processing device (e.g., a host device 100) to be coupled to a printer 200, and is provided with a processing unit 101 and a communication unit (e.g., a communication I/F 102) as illustrated in FIG. 1 and FIG. 3. Here, the printer 200 is provided with a chip (e.g., an SoC 201) for generating image data DA3 to be printed by the processing units for the Na channels from compressed image data DA2 for the Na channels included in a print command CMD1 wherein the number of channels Na is an integer no smaller than 2.

Figure 5:
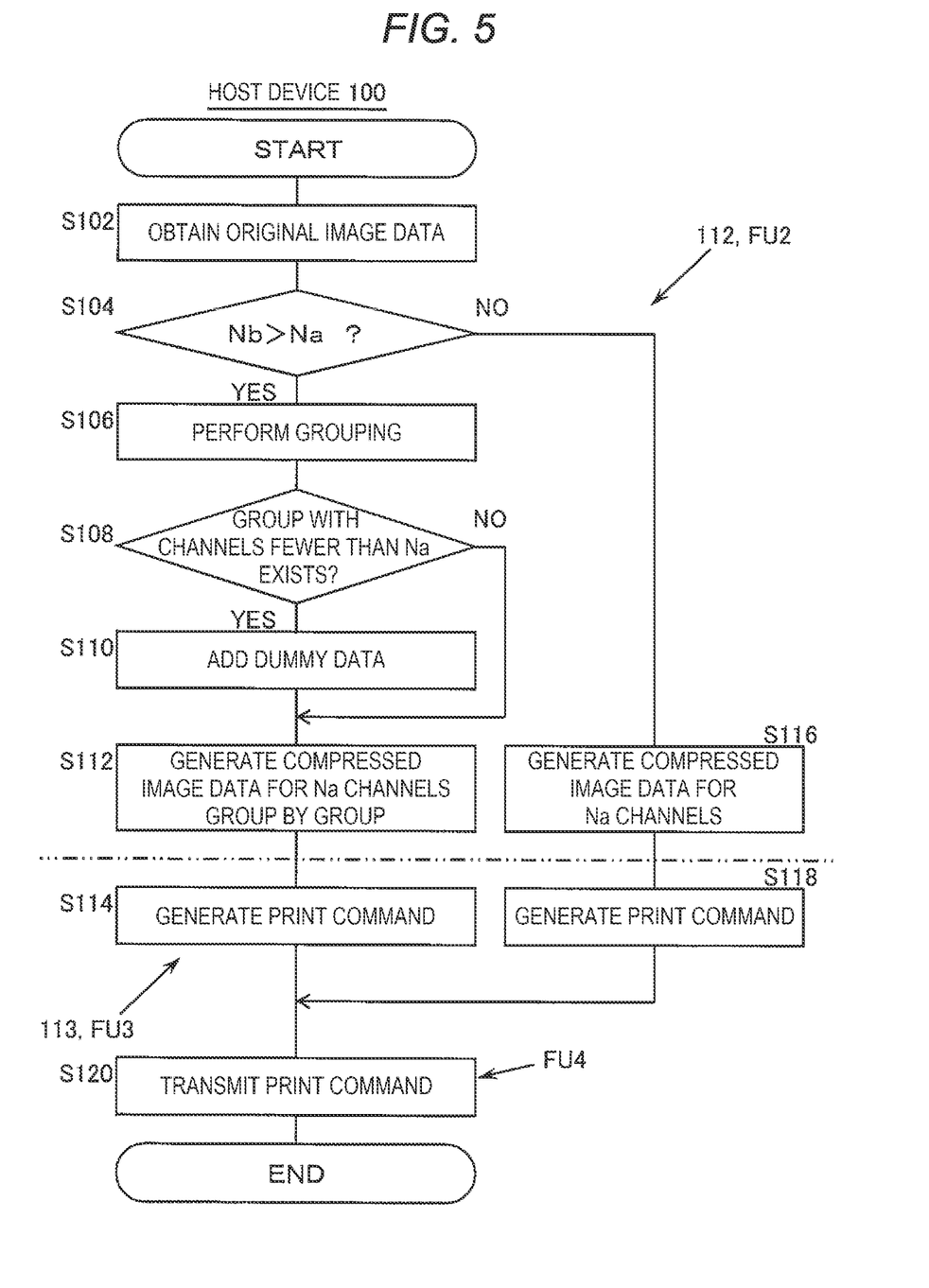
FIG. 5 is a flowchart schematically showing an example of host-side processing to be performed by the information processing device.
Figure 6:
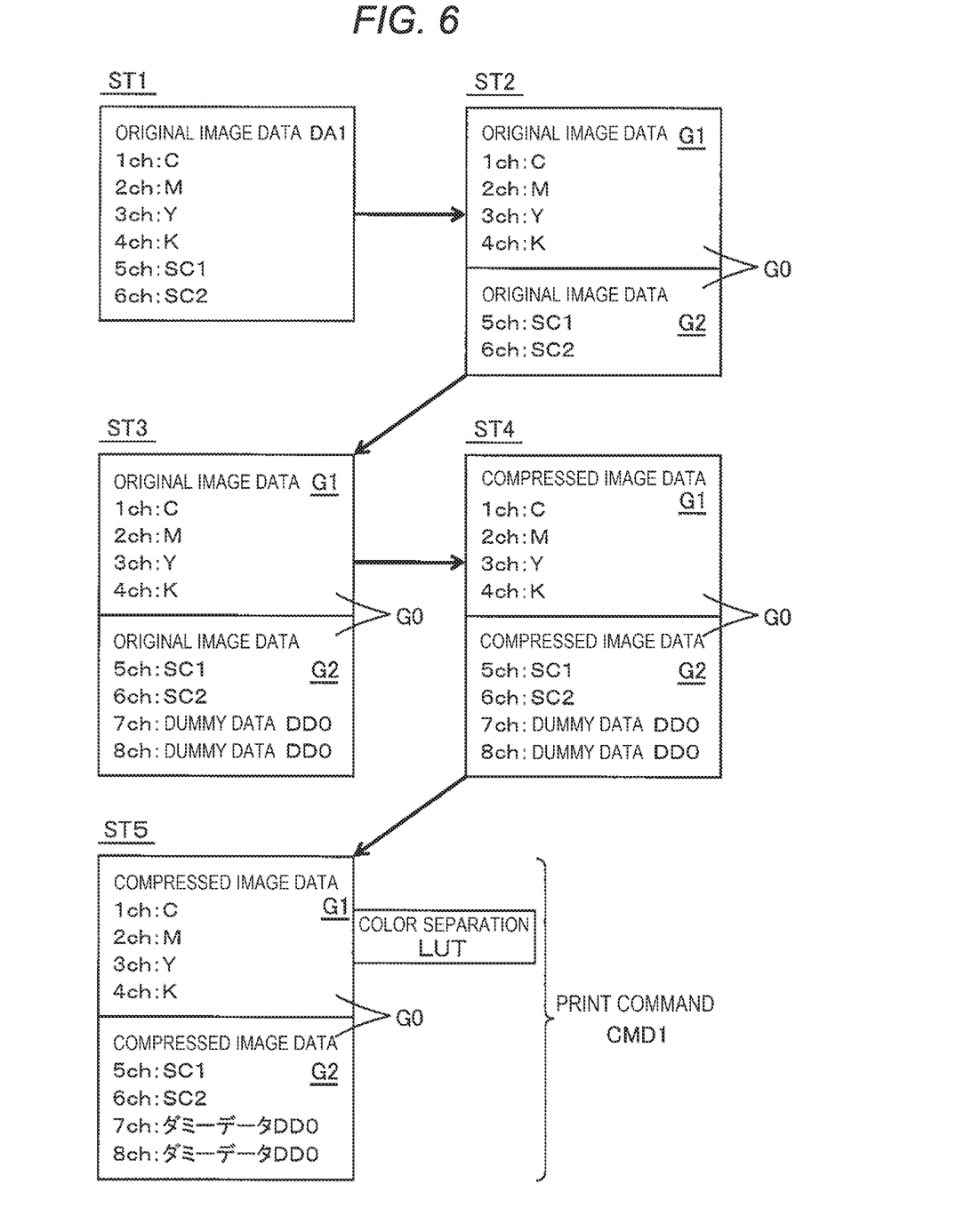
FIG. 6 is a diagram schematically showing an example of generating the print command from an original image data with a larger number of channels Nb than the number of channels Na.

As illustrated in FIG. 5 and FIG. 6, the processing unit 101 divides the original image data DA1 for a larger number of channels Nb than the number of channels Na into a plurality of groups G0 so that the number of channels of the group G0 becomes no larger than the number of channels Na to generate compressed image data DA2 for the number of channels Na according to the processing unit from the original image data DA1 included in the groups G0. The processing unit 101 generates the print command CMD1 including the compressed image data DA2 for the Na channels corresponding to each of the groups G0. The communication unit (102) transmits the print command CMD1 to the printer 200.

In the aspect described above, the print command CMD1 is transmitted to the printer 200, in which the print command CMD1 includes the compressed image data DA2 for the Na channels corresponding to each of the groups G0 according to the processing unit of the chip (201) generated from the original image data DA1 for a larger number of channels Nb than the number of channels Na. Therefore, in the aspect described above, it is possible to generate the print command from the original image data with the number of channels which fails to fall within the processing unit of the chip which processes the compressed image data by the processing unit of the predetermined number of channels in the printer without changing the chip.

Aspect 2

Figure 2:
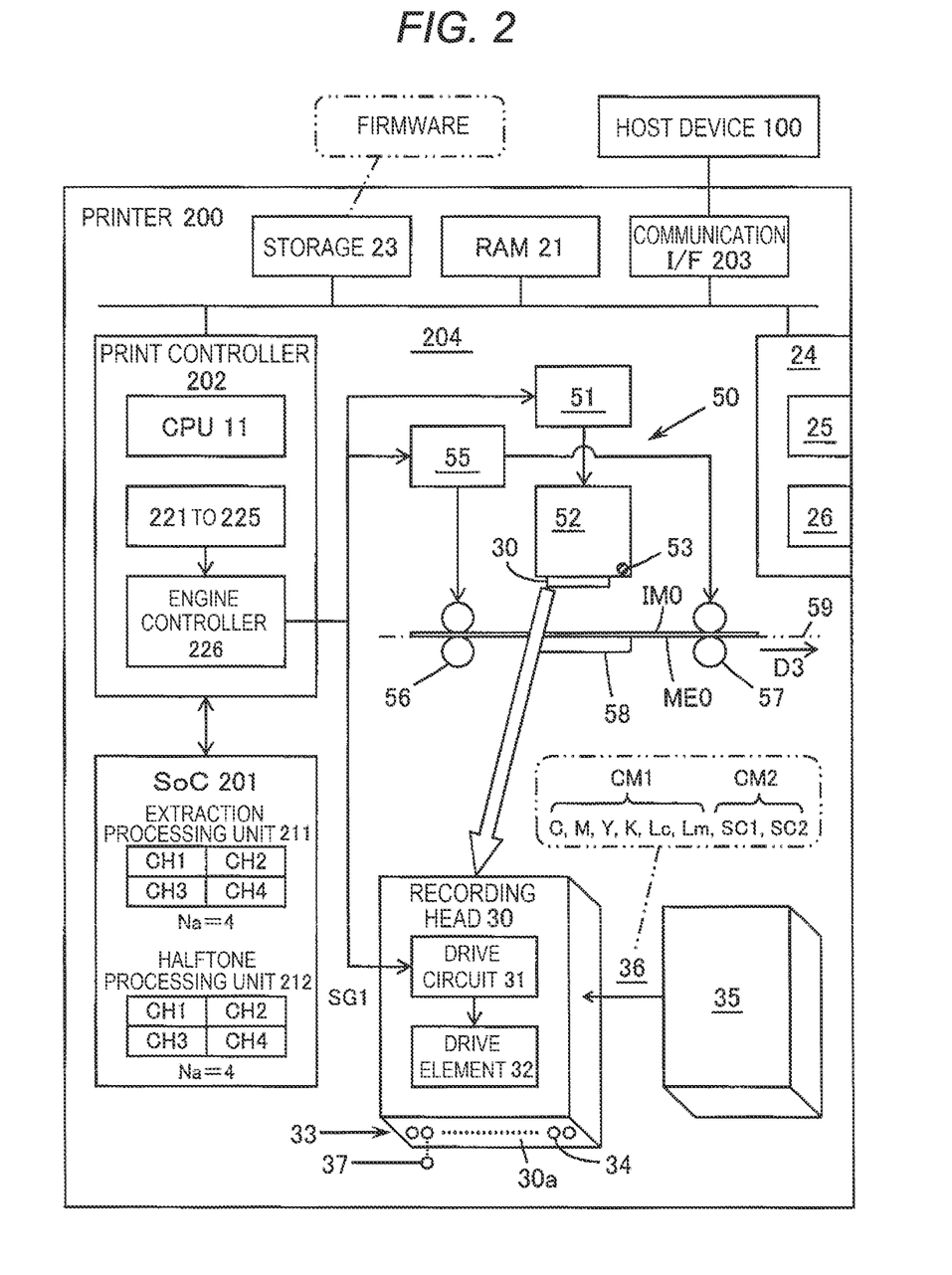
FIG. 2 is a block diagram schematically showing a configuration example of the printer.

As illustrated in FIG. 2, the number of channels Na can be 4 which corresponds to the number of process colors. The number of channels Nb can be no smaller than 5. In the present aspect, it is possible to provide a preferred example of an information processing device to be coupled to a printer provided with a chip which generates image data by the processing units for 4 channels corresponding to the process colors.

It should be noted that although not included in Aspect 2 described above, the number of channels Na is not limited to 4, and can also be no smaller than 5. When the number of channels Nb is larger than the number of channels Na, there can be obtained an advantage that it is possible to generate the print command from the original image data with the number of channels which fail to fall within the processing unit of the chip without changing the chip.

Aspect 3

Figure 4:
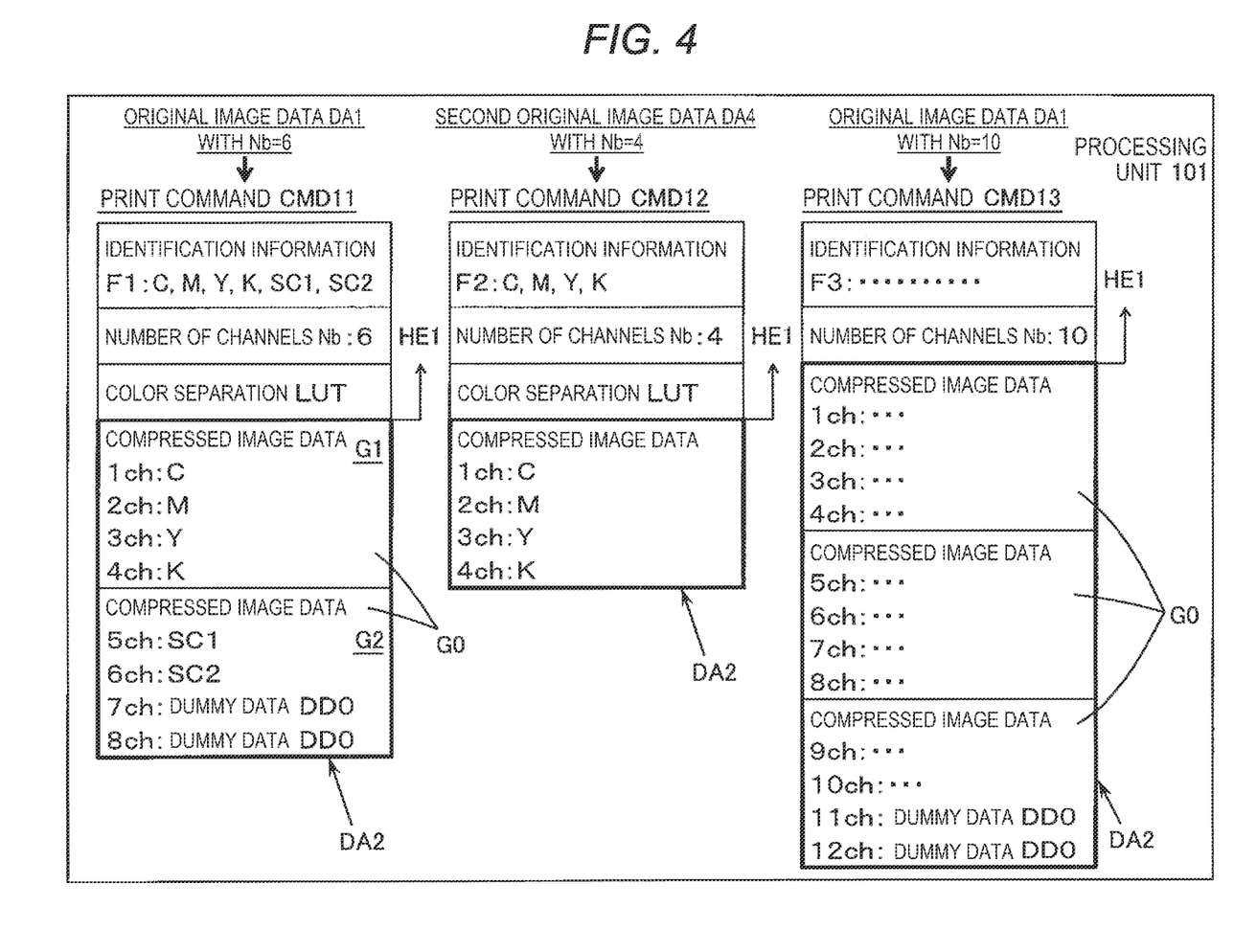
FIG. 4 is a diagram schematically showing an example of a print command generated by a processing unit.

As illustrated in FIG. 4 and FIG. 6, the number of channels Nb can be a number corresponding to the number of process colors and a special color. It is possible for the processing unit 101 to divide the original image data DA1 for the number of channels Nb into the plurality of groups G0 so as to include a process color group G1 for the 4 channels corresponding to the process colors, and at least one special color group G2 corresponding to the special color. In the present aspect, it is possible to provide a preferred example of the information processing device to be coupled to the printer for performing printing including the special color.

Aspect 4

As illustrated in FIG. 2, the printer 200 can use a plurality of first color materials CM1 for expressing the process colors, and a second color material CM2 for expressing the special color. As illustrated in FIG. 1, the image data DA3 can include first image data (e.g., pre-color-separation image data DA11) which has not been color-separated corresponding to the process color group G1, and second image data (e.g., color material usage data DA12) which corresponds to the special color group G2, and which represents the usage of the second color material CM2. It is possible for the printer 200 to receive correspondence relation information (e.g., a color separation LUT) representing a correspondence relationship between the usage of the process colors and the usage of the plurality of first color materials CM1, or to convert the first image data (DA11) into data (e.g., color material usage data DA12) representing the usage of the plurality of first color materials CM1 in accordance with the correspondence relation information (the color separation LUT). The processing unit 101 can generate the print command CMD1 including the compressed image data DA2 for the Na channels corresponding to each of the groups G0, and the correspondence relation information (the color separation LUT).

In the case described hereinabove, it is possible for the information processing device (100) to provide color separation characteristic of the first image data (DA11) corresponding to the process colors, and thus, it is possible for the information processing device (100) to directly instruct the usage of the second color material CM2 for expressing the special color. Therefore, in the aspect described above, it is possible for the present aspect to provide a more preferred example of the information processing device to be coupled to the printer for performing printing including the special color.

Here, in the color materials, there are included ink, toner, and so on. The terms "first," "second," . . . in the present application are the terms for distinguishing the constituents included in a plurality of constituents having a similarity from each other, and do not mean the order. These additional remarks are also applied to the following aspects.

Aspect 5

As shown in FIG. 5 and FIG. 6, when the number of channels Nb is not an integral multiple of the number of channels Na, it is possible for the processing unit 101 to add dummy data DD0 to the group G0 in which the number of channels of the original image data DA1 included in the group G0 is smaller than the number of channels Na out of the plurality of groups G0 so that the number of channels becomes the number of channels Na, and then generate the compressed image data DA2 for the Na channels. In the present aspect, it is possible to provide a preferred example of generating the print command from the original image data with the number of channels which fails to fall within the processing unit of the chip.

Aspect 6

Figure 7:
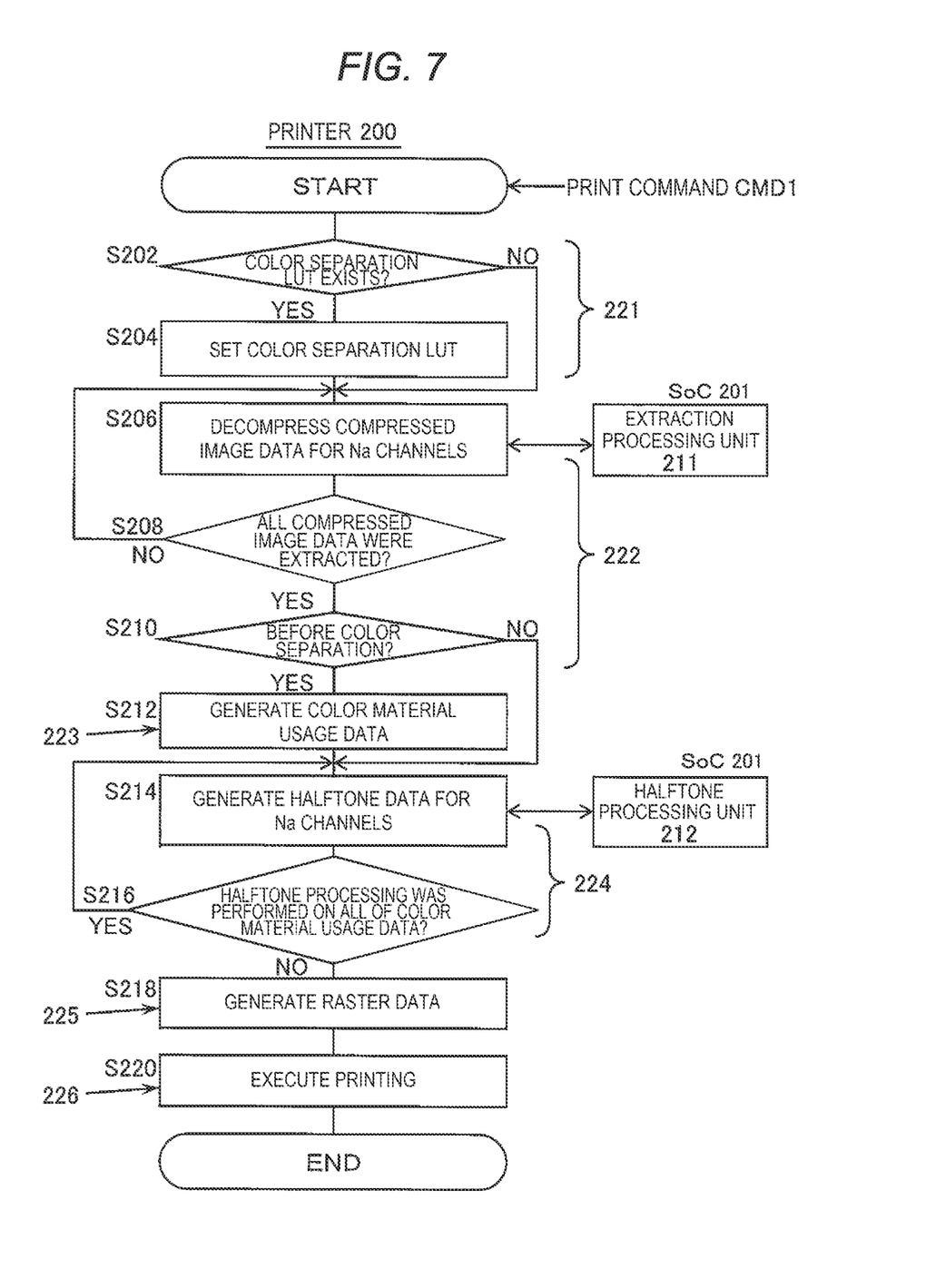
FIG. 7 is a flowchart schematically showing an example of printer-side processing to be performed by the printer.

As shown in FIG. 4 and FIG. 7, when identification information (e.g., F1) representing the fact that the compressed image data DA2 for the Na channels corresponding to each of the groups G0 is included in a header HE1 included in the print command CMD1, it is possible for the printer 200 to make the chip (201) execute processing of generating the image data DA3 by the processing unit of the Na channels from the compressed image data DA2 for the Na channels corresponding to each of the groups G0 included in the print command CMD1. As illustrated in FIG. 4 and FIG. 5, it is possible for the processing unit 101 to be capable of generating the print command CMD1 including the compressed image data DA2 for the Na channels according to the processing unit from the second original image data DA4 for the number of channels Na. When the present processing unit 101 generates the compressed image data DA2 for the Na channels corresponding to each of the groups G0 from the original image data DA1 for the number of channels Nb, it is possible for the processing unit 101 to provide the header HE1 of the print command CMD1 with the identification information (F1).

In the case described hereinabove, it is possible to generate the print command CMD1 from the original image data DA1 for the number of channels which fails to fall within the processing unit of the chip (201), and moreover, it is possible to generate the print command CMD1 also from the second original image data DA4 for the number of channels which fall within the processing unit of the chip (201). Therefore, it is possible for the aspect described above to enhance the convenience.

Aspect 7

Incidentally, as illustrated in FIG. 3, in a non-transitory computer-readable storage medium storing a print control program PRO according to an aspect of the present technology, the print control program PRO is a program for transmitting the print command CMD1 to the printer 200, and makes a computer (e.g., the host device 100) realize a compressed image data generation function FU2 and a print command generation function FU3. The compressed image data generation function FU2 divides the original image data DA1 for a larger number of channels Nb than the number of channels Na into the plurality of groups G0 so that the number of channels of each of the groups G0 becomes no larger than the number of channels Na to generate the compressed image data DA2 for the Na channels according to the processing unit from the original image data DA1 included in that group G0. The print command generation function FU3 generates the print command CMD1 including the compressed image data DA2 for the Na channels corresponding to each of the groups G0.

Also in the aspect described above, it is possible to generate the print command from the original image data with the number of channels which fails to fall within the processing unit of the chip which processes the compressed image data by the processing unit of the predetermined number of channels in the printer without changing the chip.

Aspect 8

Further, as illustrated in FIG. 1, a printing system SY1 according to an aspect of the present technology is the printing system SY1 including the printer 200 and the information processing device (100). The printer 200 is provided with a receiver (e.g., a communication I/F 203) for receiving the print command CMD1, the chip (201), and a print controller 202. The chip (201) performs predetermined processing of generating the image data DA3 to be printed by the processing unit of the Na channels from the compressed image data DA2 for the Na channels wherein the number of channels Na is an integer no smaller than 2. The print controller 202 makes the chip (201) execute the predetermined processing on the compressed image data DA2 for the Na channels corresponding to each of the plurality of groups G0 included in the print command CMD1 to execute printing based on the image data DA3 thus obtained. The information processing device (100) is provided with the processing unit 101 and the communication unit (102). The processing unit 101 divides the original image data DA1 for the larger number of channels Nb than the number of channels Na into the plurality of groups G0 so that the number of channels of each of the groups G0 becomes no larger than the number of channels Na to generate the compressed image data DA2 for the Na channels according to the processing unit from the original image data DA1 included in that group G0, and generate the print command CMD1 including the compressed image data DA2 for the Na channels corresponding to each of the plurality of the groups G0. The communication unit (102) transmits the print command CMD1 to the printer 200.

In the aspect described above, it is possible to execute printing from the original image data with the number of channels which fails to fall within the processing unit of the chip which processes the compressed image data by the processing unit of the predetermined number of channels in the printer without changing the chip.

Aspect 9

Further, as illustrated in FIG. 1 and FIG. 2, the printer 200 according to an aspect of the present technology is coupled to the information processing device (100) for transmitting the print command CMD1 including the compressed image data DA2 for the Na channels corresponding to each of the plurality of groups G0 divided so that the number of channels Nb larger than the number of channels Na becomes no larger than the number of channels Na wherein the number of channels Na is an integer no smaller than 2. The printer 200 is provided with a receiver (203) for receiving the print command CMD1, the chip (201), and the print controller 202. The chip (201) performs predetermined processing of generating the image data DA3 to be printed by the processing unit of the Na channels from the compressed image data DA2 for the Na channels. The print controller 202 makes the chip (201) execute the predetermined processing on the compressed image data DA2 for the Na channels corresponding to each of the groups G0 included in the print command CMD1 to execute printing based on the image data DA3 thus obtained.

Also in the aspect described above, it is possible to execute printing from the original image data with the number of channels which fails to fall within the processing unit of the chip which processes the compressed image data by the processing unit of the predetermined number of channels in the printer without changing the chip.

Further, the present technology can be applied to a print control method of transmitting a print command to the printer described above, a method of controlling the printing system described above, a printing method of executing printing in accordance with the print command, a control program for the printing system described above, a program of controlling printing in accordance with the print command, a computer-readable medium on which any of the programs described above is recorded, and so on. Further, it is possible for the information processing device described above to be constituted by a plurality of distributed portions, and it is possible for the printer described above to be constituted by a plurality of distributed portions.

(2) SPECIFIC EXAMPLE OF PRINTING SYSTEM

FIG. 1 schematically illustrates a configuration of the printing system SY1 including the host device 100 and the printer 200. The host device 100 is an example of the information processing device. It should be noted that it is possible for the printing system SY1 to include an additional element not shown in FIG. 1, it is possible for the host device 100 to include an additional element not shown in FIG. 1, and it is possible for the printer 200 to include an additional element not shown in FIG. 1.

The host device 100 includes the processing unit 101 and the communication I/F 102. Here, the term I/F is an abbreviation for interface. The communication I/F 102 is an example of the communication unit for transmitting the print command CMD1 to the printer 200. The processing unit 101 includes the original image data generator 111, a compression processing unit 112, and a print command generator 113. The printer 200 includes the SoC 201, the print controller 202, the communication I/F 203, and a print engine 204. Here, the term SoC is an abbreviation for System on a Chip, and denotes a semiconductor chip having a circuit for performing predetermined processing. The SoC 201 is an example of the chip. The communication I/F 203 is an example of the receiver for receiving the print command CMD1. Here, the number of channels Na is assumed as an integer no smaller than 2. The SoC 201 includes an extraction processing unit 211 for the number of channels Na, and a halftone processing unit 212 for the number of channels Na. The print controller 202 includes a command interpreter 221, an extraction controller 222, a color separation processing unit 223, a halftone controller 224, a pass decomposer 225, and an engine controller 226.

The SoC 201 performs predetermined processing of generating the image data DA3 to be printed by the processing unit of the Na channels from the compressed image data DA2 for the Na channels included in the print command CMD1. It is assumed that the number of channels Na in the present specific example is 4 which corresponds to the process colors consisting of C, M, Y, and K. In the SoC 201, the extraction processing unit 211 performs predetermined extraction processing by the processing unit of the Na channels on the compressed image data DA2 for the Na channels to thereby generate extracted data DA10 for the Na channels. Here, the extraction is also referred to as decoding or decompression. Further, in the SoC 201, the halftone processing unit 212 performs predetermined halftone processing by the processing unit of the Na channels on the color material usage data DA12 for the Na channels representing the usage of the color materials such as ink or toner to thereby generate halftone data DA13 for the Na channels. In the halftone processing, it is possible to use a dither method, an error diffusion method, a density pattern method, and so on. By the printer 200 performing image processing such as the halftone processing high in load, there is performed printing which is stable, and is difficult to be affected by a performance of the host device 100.

It should be noted that the extracted data DA10 and the halftone data DA13 are examples of the image data DA3 to be printed.

In the printing system SY1, when the printer 200 performs printing in accordance with the compressed image data DA2 for only the basic 4 colors of C, M, Y, and K constituting the process colors, it is possible for the printer 200 to perform the predetermined processing on the compressed image data DA2 for 4 channels in a lump in the SoC 201. Specifically, it is possible for the extraction processing unit 211 to perform the predetermined extraction processing on the compressed image data DA2 for the 4 channels in a lump, and it is possible for the halftone processing unit 212 to perform the predetermined halftone processing on the color material usage data DA12 in a lump. Here, in order to enhance a color reproducibility of the printing system SY1 and finely control the concentration of the color material such as ink, it is conceivable that five or more colors of color materials are used, and the host device 100 forms image data having been color-separated according to the usage of the five or more colors of color materials to be used by the printer 200. However, since the processing by the SoC 201 is only performed on the 4 channels, the data with 5 or more channels cannot automatically be processed. Changing the circuit configuration of the SoC 201 mass-produced consumes a lot of time and money. Further, in performing the predetermined processing such as the extraction or the halftone processing on the data with the 5 or more channels by changing the firmware without using the SoC 201, there is a possibility that the processing speed significantly lowers.

In the present specific example, it is arranged to realize high-speed printing without changing the circuit configuration of the SoC 201 by grouping the compressed image data DA2 larger in number of channels than the processing unit of the SoC 201 so that the number of channels becomes no higher than the number of channels according to the processing unit.

The original image data generator 111 generates the original image data DA1 for the larger number of channels Nb than the number of channels Na of the SoC 201. The original image data generator 111 can be a Raster Image Processor abbreviated as RIP. As the channels of the original image data DA1, the following examples are conceivable.

Example 1

Nb=5 channels consisting of C, M, Y, K, and one special color. As the special color, there can be cited a fluorescent color, a metallic color, a pastel color, and so on. The number of channels Nb is 5 corresponding to the process colors and the special color.

Example 2

Nb=6 channels consisting of C, M, Y, K, and two special colors. The number of channels Nb is 6 corresponding to the process colors and the special color.

Example 3

Nb=6 channels consisting of C, M, Y, K, Lc, and Lm. Here, Lc means light cyan lighter than C, and Lm means light magenta lighter than M.

Example 4

Nb=8 channels consisting of C, M, Y, K, Lc, Lm, Dy, and Lk. Here, Dy means dark yellow darker than Y, and Lk means light black lighter than K.

Example 5

Nb=10 channels consisting of C, M, Y, K, Lc, Lm, Dy, Lk, and two special colors.

Further, as the original image data, there can be cited second original image data with the number of channels Na.

Example 6

The 4 channels consisting of C, M, Y, and K.

Here, in Example 3 through Example 5, there is an assumption that the compressed image data DA2 obtained by compressing the original image data DA1 representing the usage of each of the color materials is transmitted to the printer 200. The image data corresponding to each of the color materials has a value representing an amount of the color material pixel by pixel. The original image data representing the usage of each of the color materials is the image data which represents the usage of the color material with pixel values such as numerical values from 0 to 100%, grayscale values in $2^8$ gray levels, or grayscale values in $2^{16}$ gray levels for each of the color materials. In the special colors in Example 1 and Example 2, there is an assumption that the compressed image data DA2 obtained by compressing the original image data DA1 representing the usage of each of the color materials is transmitted to the printer 200. In these cases, the extracted data DA10 obtained by the extraction processing from the compressed image data DA2 becomes the color material usage data DA12. Regarding C, M, Y, and K constituting the process colors in Example 1, Example 2, and Example 6, the compressed image data DA2 obtained by compressing the original image data DA1 which is not color-separated including the second original image data which is not color-separated can be transmitted to the printer 200. The original image data representing the amount of each of the colors included in the process colors is the image data which represents the amount of the color with pixel values such as numerical values from 0 to 100%, grayscale values in $2^8$ gray levels, or grayscale values in $2^{16}$ gray levels for each of the colors. When the compressed image data DA2 obtained by compressing the original image data DA1 which is not color-separated is transmitted to the printer 200, the extracted data DA10 obtained by the extraction processing from the compressed image data DA2 becomes the pre-color-separation image data DA11.

When Nb>Na is true, as illustrated in FIG. 6, the compression processing unit 112 divides the original image data DA1 into the plurality of groups G0 so that the number of channels becomes no larger than the number of channels Na. On that basis, the compression processing unit 112 generates the compressed image data DA2 for the Na channels according to the processing unit of the SoC 201 from the original image data DA1 included in each of the groups G0. The compression also called encode. As the compression, there is widely used lossless compression such as an RHV2 method in which a pixel value is compared with a last raster to obtain a difference therebetween, run length encoding, or Huffman coding. It is sufficient for the extraction processing unit 211 of the SoC 201 to perform extraction processing using an extraction method corresponding to the compression method.

The print command generator 113 generates the print command CMD1 including the compressed image data DA2 for the Na channels corresponding to each of the groups G0. The details of the compression processing unit 112 and the print command generator 113 will be described later.

The communication I/F 102 of the host device 100 transmits the print command CMD1 to the printer 200. The communication I/F 102 is coupled to the printer 200 with wire or wirelessly to input/output information to/from the printer 200. The communication I/F 203 of the printer 200 receives the print command CMD1 from the host device 100. The communication I/F 203 is coupled to the host device 100 with wire or wirelessly to input/output information to/from the host device 100. As a standard of the communication I/F 102, 203, there can be used USB, a Near Field Communication standard, and so on. Here, the term USB is an abbreviation for Universal Serial Bus.

The command interpreter 221 interprets the print command CMD1 from the host device 100. As illustrated in FIG. 4, when the color separation LUT is included in the header HE1 of the print command CMD1, the command interpreter 221 sets the color separation LUT to the color separation processing unit 223. Here, the term LUT is an abbreviation for a look-up table. The color separation LUT is an example of the correspondence relationship information representing the correspondence relationship between the usage of the process colors and the usage of each of the color materials.

The extraction controller 222 makes the extraction processing unit 211 of the SoC 201 execute the extraction processing of generating the extracted data DA10 by the processing unit of Na channels from the compressed image data DA2 for the Na channels included in the print command CMD1. When the extracted data DA10 is the pre-color-separation image data DA11, the extraction controller 222 passes the pre-color-separation image data DA11 to the color separation processing unit 223. The pre-color-separation image data DA11 is the image data representing the amount of color with the pixel values such as the numerical values from 0 to 100%, the grayscale values in $2^8$ gray levels, or the grayscale values in $2^{16}$ gray levels with respect to each of the colors which have not been separated from each other such as C, M, Y, and K included in the process colors. When the extracted data DA10 is the color material usage data DA12, the extraction controller 222 passes the color material usage data DA12 to the halftone controller 224. The color material usage data DA12 is the image data representing the usage of the color material with the pixel values such as the numerical values from 0 to 100%, the grayscale values in $2^8$ gray levels, or the grayscale values in $2^{16}$ gray levels with respect to each of the color materials such as C, M, Y, K, Lc, and Lm mounted on the printer 200.

The color separation processing unit 223 color-separates the pre-color-separation image data DA11 into the color material usage data DA12 in accordance with the color separation LUT. The color separation LUT is a default color separation LUT in some cases, or is a color separation LUT set by the command interpreter 221 in some cases. When the number of types of the color materials is larger than the number of colors which have not been color-separated from each other, the number of channels in the color material usage data DA12 becomes larger than the number of channels in the pre-color-separation image data DA11. As a result, the number of groups G0 increases in some cases, and when the pre-color-separation image data DA11 is not grouped, the color material usage data DA12 is divided into the plurality of groups G0 in some cases. The color separation processing unit 223 passes the color material usage data DA12 to the halftone controller 224.

The halftone controller 224 makes the halftone data processing unit 212 of the SoC 201 execute the halftone processing of generating the halftone data DA13 by the processing unit of the Na channels from the color material usage data DA12 for the Na channels. The halftone data DA13 representing a formation state of a dot of each of the color materials represents the formation state of the dot pixel by pixel. The halftone data DA13 can be binary data representing presence or absence of the formation of the dot, or can also be multivalued data no smaller than three gray levels capable of dealing with dots different in size from each other such as a small dot, a medium dot, and a large dot. The halftone controller 224 passes the halftone data DA13 to the pass decomposer 225.

The pass decomposer 225 generates a raster data DA14 by performing rasterizing processing of sorting the halftone data DA13 in an order in which the dots are formed by the print engine 204. The raster data DA14 represents the state of the dots formed in a single main scanning operation pixel by pixel. The pass decomposer 225 passes the raster data DA14 to the engine controller 226.

The engine controller 226 generates a drive signal SG1 illustrated in FIG. 2 from the raster data DA14, and then outputs the drive signal SG1 to the print engine 204. The details of the print engine 204 will be described later.

FIG. 2 schematically illustrates a configuration of the printer 200.

The printer 200 shown in FIG. 2 is a serial printer as a type of an inkjet printer, and is provided with the SoC 201, the print controller 202, the communication I/F 203, the print engine 204, a RAM 21, a storage 23, an operation panel 24, and so on. Here, the term RAM is an abbreviation for Random Access Memory. The print controller 202, the communication I/F 203, the RAM 21, the storage 23, and the operation panel 24 are coupled to a bus, and are made capable of inputting/outputting information to/from each other. The print engine 204 is provided with a recording head 30, a driver 50, and so on. The RAM 21 is a high-capacity and volatile semiconductor memory, and stores the print command CMD1 received from the host device 100 and so on. The storage 23 stores the firmware and so on. As the storage 23, there can be used a nonvolatile semiconductor memory such as a flash memory, a magnetic storage device such as a hard disk drive, or the like. The operation panel 24 is provided with a display 25 such as a liquid crystal panel, an input unit 26 such as a touch panel or an operation key, and so on.

The SoC 201 is provided with the extraction processing unit 211 having channels CH1, CH2, CH3, and CH4, and the halftone processing unit 212 having channels CH1, CH2, CH3, and CH4.

The print controller 202 is provided with a CPU 11 as a processor, the constituents (221 through 226) described above, and so on. Here, the term CPU is an abbreviation for Central Processing Unit. The CPU 11 is a device which plays a central role of information processing and controlling in the host device 100. The engine controller 226 generates the drive signal SG1 corresponding to a voltage signal to be applied to a drive element 32 of the recording head 30 from the raster data DA14, and then outputs the drive signal SG1 to a drive circuit 31 of the recording head 30. For example, when the raster data DA14 is "dot formation," the engine controller 226 outputs the drive signal SG1 for ejecting an ink droplet used for the dot formation. Further, when the raster data DA14 is four-valued data, the engine controller 226 outputs the drive signal SG1 for ejecting the ink droplet for the large dot when the raster data DA14 is "large dot formation," outputs the drive signal SG1 for ejecting the ink droplet for the medium dot when the raster data DA14 is "medium dot formation," and outputs the drive signal SG1 for ejecting the ink droplet for the small dot when the raster data DA14 is "small dot formation."

The driver 50 to be controlled by the engine controller 226 is provided with a carriage driver 51 and a roller driver 55. The driver 50 makes the carriage driver 51 drive a carriage 52 to make a reciprocal motion along a main scanning direction, and makes the roller driver 55 drive a recording medium ME0 to move toward a feed direction D3 along a conveying path 59. In FIG. 2, the feed direction D3 is a rightward direction, the left side is called upstream, and the right side is called downstream. In accordance with the control by the engine controller 226, the carriage driver 51 performs main scanning of reciprocating the carriage 52 along the main scanning direction. The roller driver 55 includes a conveying roller pair 56 and an ejection roller pair 57. In accordance with the control by the engine controller 226, the roller driver 55 performs sub-scanning of feeding the recording medium ME0 toward the feed direction D3 by rotating a driving conveying roller of the conveying roller pair 56 and a driving ejection roller of the ejection roller pair 57. The recording medium ME0 means a material for holding a printed image, and is formed of paper, resin, metal, or the like. The shape of the recording medium ME0 is not particularly limited, there can be cited a variety of shapes such as a rectangular shape, or rolled shape, and a 3D-shape can also be adopted.

On the carriage 52, there is mounted the recording head 30. On the carriage 52, there can be mounted an ink cartridge 35 from which ink 36 to be ejected as an ink droplet 37 is supplied to the recording head 30. Obviously, the ink 36 can be supplied to the recording head 30 from the ink cartridge 35 installed outside the carriage 52 via a tube. Here, the ink 36 is an example of the color material. The carriage 52 is fixed to an endless belt not shown, and can reciprocate along a guide 53 which is elongated, and a longitudinal direction of which is set along the main scanning direction. The carriage driver 51 is formed of a servomotor, and reciprocates the carriage 52 in accordance with an instruction from the engine controller 226.

The conveying roller pair 56 located upstream of the recording head 30 feeds the recording medium ME0 nipped by itself toward the recording head 30 due to the rotation of the driving conveying roller when performing the sub-scanning. The ejection roller pair 57 located downstream of the recording head 30 conveys the recording medium ME0 nipped by itself toward a catch tray not shown due to the rotation of the driving ejection roller when performing the sub-scanning. The roller driver 55 is formed of a servomotor, and makes the conveying roller pair 56 and the ejection roller pair 57 operate in accordance with an instruction from the engine controller 226 to feed the recording medium ME0 toward the feed direction D3.

A platen 58 is located at a lower side of a conveying path 59, and makes contact with the recording medium ME0 located on the conveying path 59 to thereby support the recording medium ME0. The recording head 30 controlled by the engine controller 226 ejects the ink droplet 37 toward the recording medium ME0 supported by the platen 58 to thereby make the ink 36 adhere to the recording medium ME0.

The recording head 30 has a plurality of nozzles 34 for ejecting the ink droplet 37 arranged on a nozzle surface 30a, and ejects the ink droplet 37 on the recording medium ME0 on the platen 58 to thereby perform printing. Here, the nozzle means a small opening from which the ink droplet is jetted, and a nozzle array means an arrangement of a plurality of nozzles. The nozzle surface 30a is an ejection surface of the ink droplet 37. The recording head 30 is provided with the drive circuit 31, the drive element 32, and so on. The drive circuit 31 applies a voltage signal to the drive element 32 in accordance with the drive signal SG1 input from the engine controller 226. As the drive element 32, there can be used a piezoelectric element for applying pressure to the ink 36 in a pressure chamber communicated with the nozzle 34, a drive element for generating a bubble in the pressure chamber with heat to eject the ink droplet 37 from the nozzle 34, or the like. To the pressure chamber of the recording head 30, there is supplied the ink 36 from the ink cartridge 35. A combination of the ink cartridge 35 and a nozzle array 33 is disposed for each color of the ink 36. The ink 36 in the pressure chamber is ejected by the drive element 32 from the nozzle 34 toward the recording medium ME0 as the ink droplet 37. Thus, a dot of the ink droplet 37 is provided to the recording medium ME0. By repeating an operation in which the dots corresponding to the raster data DA14 are formed while the recording head 30 moves in the main scanning direction, and then the recording medium ME0 is fed toward the feed direction D3 as much as a single sub-scanning action, a print image IMO is provided to the recording medium ME0.

FIG. 2 shows the ink 36 of C, M, Y, K, Lc, Lm, a special color SC1, and a special color SC2. Here, the ink 36 of C, M, Y, K, Lc, and Lm is an example of the first color material CM1 for expressing the process color. The ink 36 of the special color SC1 and the special color SC2 is an example of the second color material CM2 for expressing a special color. The printer 200 uses the first color material CM1 and the second color material CM2 described above. Obviously, there can be adopted a variety of combinations of the types of the ink 36 available for the printer 200.

FIG. 3 schematically illustrates a configuration of the host device 100. The host device 100 includes a computer such as a personal computer or a tablet terminal, a cellular phone such as a smartphone, a digital camera, and digital video camera.

The host device 100 shown in FIG. 3 is provided with a CPU 121, a ROM 122, a RAM 123, a storage device 124, an input device 125, a display device 126, the communication I/F 102, and so on. These constituents (121 through 126, 102, and so on) are coupled to a bus, and are made capable of inputting/outputting information to/from each other. Here, the term ROM is an abbreviation for Read Only Memory. The host device 100 can have all of the constituents (121 through 126, 102, and so on) in a single chassis, but can also be constituted by a plurality of devices separated so as to be able to communicate with each other.

The storage device 124 stores an operating system not shown, the print control program PRO, and so on. These are arbitrarily retrieved in the RAM 123, and are used for the print control processing. As the storage device 124, there can be used a nonvolatile semiconductor memory such as a flash memory, a magnetic storage device such as a hard disk drive, or the like. As the input device 125, there can be used a pointing device, hard keys including a keyboard, a touch panel attached to a surface of a display panel, or the like. As the display device 126, there can be used a liquid crystal display panel or the like.

The print control program PRO makes the host device 100 realize an original data generation function FU1 corresponding to the original image data generator 111, the compressed image data generation function FU2 corresponding to the compression processing unit 112, the print command generation function FU3 corresponding to the print command generator 113, and a print command transmission function FU4. It can be said that the print control program PRO makes the host device 100 function as the processing unit 101 including the original image data generator 111, the compression processing unit 112, and the print command generator 113.

The original image data generation function FU1 generates the original image data DA1 for the larger number of channels Nb than the number of channels Na of the SoC 201. When Nb>Na is true, the compressed image data generation function FU2 divides the original image data DA1 into the plurality of groups G0 so that the number of channels of each of the groups G0 becomes no larger than the number of channels Na to generate the compressed image data DA2 for the Na channels according to the processing unit of the SoC 201 from the original image data DA1 included in that group G0. The print command generation function FU3 generates the print command CMD1 including the compressed image data DA2 for the Na channels corresponding to each of the groups G0. The print command transmission function FU4 performs processing of transmitting the print command CMD1 to the printer 200 in cooperation with the communication I/F 102.

FIG. 4 schematically illustrates the print commands CMD11 through CMD13 generated by the processing unit 101. The print commands CMD11 through CMD13 each include the header HE1 and the compressed image data DA2. These print commands CMD11 through CMD13 are included in the print command CMD1 shown in FIG. 1. The term "ch" shown in the compressed image data DA2 means a channel.

When the channels in the original image data DA1 are Nb=6 channels corresponding respectively to C, M, Y, K, and the two types of special colors as in Example 2 described above, for example, the print command CMD11 is generated. The header HE1 of the print command CMD11 includes identification information F1 representing the fact that the compressed image data DA2 for the Na channels corresponding to the plurality of groups G0 is included, the number of channels Nb=6, the color separation LUT for color-separating the usage of the process colors, and so on. The number of groups G0 is 2 which is obtained by rounding out Nb/Na=1.5 to the whole number. The two groups G0 include the process color group G1 for the 4 channels corresponding to the process colors, and the special color group G2 corresponding to the two types of special colors. In the process color group G1 in the print command CMD11, C is assigned to 1ch, M is assigned to 2ch, Y is assigned to 3ch, and K is assigned to 4ch. The assignment of the colors to the channels is not limited to the example shown in FIG. 4, and it is possible to assign, for example, K to 1ch, Y to 2ch, M to 3ch, and C to 4ch. In the special color group G2 in the print command CMD11, the special color SC1 is assigned to 5ch, and the special color SC2 is assigned to 6ch. Here, since the number of channels Na is 4, the special color group G2 has 7ch and 8ch. Therefore, to each of 7ch and 8ch, there is assigned dummy data DD0. A value of the dummy data DD0 is not particularly limited, and can be set to 0, FF in hexadecimal, or the like. Also in the special color group G2, the assignment of the colors to the channels is not limited to the example shown in FIG. 4, and it is possible to assign, for example, the dummy data DD0 to 5ch and 6ch, the special color SC2 to 7ch, and the special color SC1 to 8ch.

It should be noted that when the number of types of the special colors is larger than the number of channels Na, the original image data DA1 for the number of channels Nb is divided into a plurality of groups G0 including a plurality of special color groups G2.

When the channels in the second original image data DA4 are Nb=4 channels corresponding respectively to C, M, Y, and K as in Example 6 described above, the second original image data DA4 is not grouped, and for example, the print command CMD12 is generated. It should be noted that the number of channels of the second original image data DA4 when being not grouped is also described as Nb. The header HE1 of the print command CMD12 includes identification information F2 representing the fact that the compressed image data DA2 for the Na channels corresponding to the process colors is included, the number of channels Nb=4, the color separation LUT for color-separating the usage of the process colors, and so on. In the plurality of compressed image data DA2 in the print command CMD12, C is assigned to 1ch, M is assigned to 2ch, Y is assigned to 3ch, and K is assigned to 4ch. Obviously, the assignment of the colors to the channels is not limited to the example shown in FIG. 4.

When the channels in the original image data DA1 are Nb=10 channels as in Example 5 described above, for example, the print command CMD13 is generated. The header HE1 of the print command CMD13 includes identification information F3 representing the fact that the compressed image data DA2 for the Na channels corresponding to the plurality of groups G0 is included, the number of channels Nb=10, and so on. The number of groups G0 is 3 which is obtained by rounding out Nb/Na=2.5 to the whole number. Here, since a triplication of the number of channels Na=4 is 12, the dummy data DD0 is assigned to 11ch and 12ch.

(3) SPECIFIC EXAMPLE OF PROCESSING PERFORMED IN PRINTING SYSTEM

FIG. 5 schematically illustrates host-side processing to be performed by the host device 100 shown in FIG. 1 and FIG. 3. The processing shown in FIG. 5 starts when a user operation for executing printing based on the original image data DA1 including the second original image data DA4 is received in the input device 125. Here, the steps S102 through S112, and S116 correspond to the compression processing unit 112 and the compressed image data generation function FU2. The steps S114, S118 correspond to the print command generator 113 and the print command generation function FU3. The step S120 corresponds to the print command transmission function FU4. Hereinafter, the description of "step" will be omitted, and the reference symbol of the step will be described in parentheses in some cases. FIG. 6 schematically illustrates a condition of generating the print command CMD1 from the original image data DA1 for a larger number of channels Nb than the number of channels Na.

When the host-side processing shown in FIG. 5 starts, the host device 100 obtains the original image data DA1 including the second original image data DA4 from the original image data generator 111 (S102). In the step ST1 shown in FIG. 6, there is shown the original image data DA1 in which the channels are Nb=6 channels corresponding respectively to C, M, Y, K, and two types of special colors as in Example 2 described above. Here, it is assumed that the original image data DA1 of C, M, Y, and K is the image data having not been color-separated, and the original image data DA1 of the special colors SC1, SC2 is the image data representing the usage of the color materials. In this case, the extracted data DA10 generated by the extraction processing unit 211 of the SoC 201 includes the pre-color-separation image data DA11 of C, M, Y, and K, and the color material usage data DA12 of the special colors SC1, SC2. Here, the pre-color-separation image data DA11 of C, M, Y, and K is an example of first image data before the color separation corresponding to the process color group G1. The color material usage data DA12 of the special colors SC1, SC2 is an example of second image data corresponding to the special color group G2.

Subsequently, the host device 100 determines whether or not the number of channels Nb is larger than the number of channels Na of the SoC 201 (S104). The host device 100 makes the processing proceed to the step S106 when Nb>Na is true, and makes the processing proceed to the step S116 when Nb=Na is true. It should be noted that it is not assumed that the number of channels Nb is smaller than the number of channels Na, but it is possible for the host device 100 to make the processing proceed when Nb<Na is true on the assumption that the dummy data DD0 is added.

When Nb>Na is true, the host device 100 divides the original image data DA1 with the number of channels Nb into the plurality of groups G0 so that the number of channels becomes no larger than the number of channels Na (S106). Here, defining the number of groups G0 as Ng, the number of groups Ng becomes an integer obtained by rounding out Nb/Na to the whole number. When Nb=6 is set, as shown in FIG. 6, the original image data DA1 with the number of channels Nb is divided into two groups G0. Here, when C, M, Y, and K constituting the process colors are included in the Nb channels, the host device 100 divides the original image data DA1 with the number of channels Nb into the process color group G1 and at least one special color group G2. In the step ST2 shown in FIG. 6, there is shown the fact that the original image data DA1 with the number of channel Nb is divided into the process color group G1 for the Na channels and the special color group G2 for the Nb-Na channels. As described above, the host device 100 divides the original image data DA1 with the number of channels Nb into the plurality of groups G0 so as to include the process color group G1 for the 4 channels corresponding to the process colors, and at least one special color group G2 corresponding to the special color.

Subsequently, the host device 100 determines whether or not the group G0 smaller in number of channels than Na exists in the plurality of groups G0 (S108). When the number of channels Nb is an integer multiple of the number of channels Na, the group G0 smaller in number of channels than Na does not exist. In this case, the host device 100 makes the processing proceed to the step S112 without using the processing in the step S110. When the number of channels Nb is not an integer multiple of the number of channels Na, there exists the group G0 smaller in number of channels than Na. In this case, the host device 100 adds the dummy data DD0 to the group G0 including the original image data DA1 smaller in number of channels than the number of channels Na out of the plurality of groups G0 so that the number of channels Na is achieved (S110). In the step ST2 shown in FIG. 6, the number of channels Nb–Na=2 of the original image data DA1 included in the special color group G2 is smaller than the number of channels Na=4. In the step ST3 shown in FIG. 6, there is shown the fact that the dummy data DD0 is added to each of 7ch and 8ch so that the number of channels Na is achieved with respect to the special color group G2. The host device 100 makes the processing proceed to the step S112 after the processing in the step S110.

In the step S112, the host device 100 generates the compressed image data DA2 for the Na channels according to the processing unit of the SoC 201 from the original image data DA1 included in the groups G0 for each of the groups G0. In the step ST4 shown in FIG. 6, there is shown the fact that the compressed image data DA2 for the Na=4 channels is generated from the original image data DA1 included in the process color group G1, and the compressed image data DA2 for the Na=4 channels is generated from the original image data DA1 and the dummy data DD0 included in the special color group G2.

Subsequently, the host device 100 creates the header HE1 according to the number of channels Nb and the type of the original image data DA1, and then generates the print command CMD1 including the compressed image data DA2 for the Na channels corresponding to each of the groups G0 (S114). As in the print command CMD11 shown in FIG. 4, the host device 100 includes the identification information F1 representing the fact that the compressed image data DA2 for the Na channels corresponding to each of the plurality of groups G0 is included, and the number of channels Nb in the header HE1, and includes the color separation LUT in the header HE1 as needed. The process color group G1 shown in FIG. 6 is a transmission target of the color separation LUT representing the correspondence relationship between the usage of the process colors and the usage of the plurality of first color materials CM1. In the step ST5 shown in FIG. 6, there is shown the fact that the print command CMD1 including the compressed image data DA2 for the Na channels corresponding to each of the groups G0 and the color separation LUT is generated. The host device 100 makes the processing proceed to the step S120 after the processing in the step S114.

When Nb=Na is true in the determination processing in the step S104, the host device 100 generates the compressed image data DA2 for the Na channels according to the processing unit of the SoC 201 from the second original image data DA4 with the number of channels Na (S116). In the print command CMD12 shown in FIG. 4, there is shown the compressed image data DA2 for the Na=4 channels generated from the second original image data DA4 with the number of channels Na=4.

Subsequently, the host device 100 creates the header HE1 according to the number of channels Na and the type of the second original image data DA4, and then generates the print command CMD1 including the compressed image data DA2 for the Na channels (S118). As in the print command CMD12 shown in FIG. 4, the host device 100 includes the identification information F2 representing the fact that the number of channels included in the compressed image data DA2 is Na, and the number of channels Nb=Na=4 in the header HE1, and includes the color separation LUT in the header HE1 as needed. The compressed image data DA2 for the Na channels corresponding to the process colors is the transmission target of the color separation LUT. FIG. 4 shows the fact that the print command CMD12 including the compressed image data DA2 for the Na channels and the color separation LUT is generated. The host device 100 makes the processing proceed to the step S120 after the processing in the step S114.

In the step S120, the host device 100 transmits the print command CMD1 generated in the processing in the step S114 or the step S118 to the printer 200. Subsequently, the host device 100 terminates the host-side processing.

FIG. 7 schematically illustrates printer-side processing to be performed by the printer 200 shown in FIG. 1 and FIG. 2. The processing shown in FIG. 7 starts when the communication I/F 203 of the printer 200 receives the print command CMD1 from the host device 100. Therefore, when the color separation LUT is included in the print command CMD1, the printer 200 receives the color separation LUT as a result. Here, the steps S202 through S204 correspond to the command interpreter 221. The steps S206 through S210 correspond to the extraction controller 222. The step S212 corresponds to the color separation processing unit 223. The steps S214 through S216 correspond to the halftone controller 224. The step S218 corresponds to the pass decomposer 225. The step S220 corresponds to the engine controller 226.

When the printer-side processing shown in FIG. 7 starts, the printer 200 determines whether or not the color separation LUT is included in the header HE1 of the print command CMD1 (S202). When the color separation LUT exists in the print command CMD1, the printer 200 sets the color separation LUT included in the print command CMD1 to the color separation processing unit 223 (S204), and then makes the processing proceed to the step S206. When the color separation LUT is not included in the print command CMD1, the printer 200 makes the processing proceed to the step S206 without performing the processing in the step S204.

In the step S206, the printer 200 passes the compressed image data DA2 for the Na channels included in the print command CMD1 to the extraction processing unit 211 of the SoC 201 to make the extraction processing unit 211 execute the extraction processing. When the identification information F1 representing the fact that compressed image data DA2 for the Na channels corresponding to each of the plurality of groups G0 is included is included in the header HE1, the printer 200 sequentially sets the groups G0 as the processing target out of the plurality of groups G0, and makes the extraction processing unit 211 of the SoC 201 execute the extraction processing of the compressed image data DA2 for the Na channels included in the group G0 thus set. The extraction processing unit 211 performs the extraction processing by the processing unit of the Na channels on the compressed image data DA2 for the Na channels to thereby generate the extracted data DA10 for the Na channels. When the dummy data DD0 is included in the extracted data DA10, the printer 200 deletes the dummy data DD0 from the extracted data DA10.

Subsequently, the printer 200 determines whether or not all of the compressed image data DA2 included in the print command CMD1 have been extracted (S208). When there remains the compressed image data DA2 not yet extracted, the printer 200 returns the processing to the step S206, and then makes the extraction processing unit 211 of the SoC 201 execute the extraction processing of the compressed image data DA2 for the Na channels included in the next group G0.

When all of the compressed image data DA2 included in the print command CMD1 have been extracted, the printer 200 determines whether or not the pre-color-separation image data DA11 is included in the extracted data DA10 obtained by the processing in the steps S206 through S208 (S210). As described above, the pre-color-separation image data DA11 is the image data which represents the amount of the color with the pixel values such as numerical values from 0 to 100%, grayscale values in $2^8$ gray levels, or grayscale values in $2^{16}$ gray levels for each of the colors. When the pre-color-separation image data DA11 is included in the extracted data DA10, the printer 200 color-separates the pre-color-separation image data DA11 into the color material usage data DA12 in accordance with the color separation LUT thus set (S212), and then makes the processing proceed to the step S214. As described above, the color material usage data DA12 is the image data which represents the usage of the color material with the pixel values such as numerical values from 0 to 100%, grayscale values in $2^8$ gray levels, or grayscale values in $2^{16}$ gray levels for each of the color materials. When the number of types of the color materials is larger than the number of colors which have not been color-separated from each other, the number of channels in the color material usage data DA12 becomes larger than the number of channels in the pre-color-separation image data DA11. As a result, the number of groups G0 increases in some cases, and when the pre-color-separation image data DA11 is not grouped, the color material usage data DA12 is divided into the plurality of groups G0 in some cases. When the color material usage data DA12 is not included in the extracted data DA10, the printer 200 makes the processing proceed to the step S214 without performing the processing in the step S212.

For example, when a part of the extracted data DA10 becomes the pre-color-separation image data DA11 as the first image data, and the rest becomes the color material usage data DA12 as the second image data as shown in the step ST5 shown in FIG. 6, color separation processing is performed on the pre-color-separation image data DA11 out of the extracted data DA10.

In the step S214, the printer 200 passes the color material usage data DA12 for the Na channels to the halftone processing unit 212 of the SoC 201 to make the halftone processing unit 212 execute the halftone processing. When the color material usage data DA12 is divided into the plurality of groups G0, the printer 200 sequentially sets the groups G0 as the processing target out of the plurality of groups G0, and then makes the halftone processing unit 212 of the SoC 201 execute the halftone processing of the color material usage data DA12 for the Na channels included in the group G0 thus set. Here, the printer 200 adds the dummy data to the group G0 including the color material usage data DA12 smaller in number of channels than the number of channels Na out of the plurality of groups G0 so that the number of channels Na is achieved. The halftone processing unit 212 performs the halftone processing by the processing unit of the Na channels on the color material usage data DA12 for the Na channels to thereby generate the halftone data DA13 for the Na channels. When the dummy data is included in the color material usage data DA12, the printer 200 deletes the dummy data from the halftone data DA13.

Subsequently, the printer 200 determines whether or not the halftone processing of all of the color material usage data DA12 has been performed (S216). When there remains the color material usage data DA12 on which the halftone processing has not been performed, the printer 200 returns the processing to the step S214, and then makes the halftone processing unit 212 of the SoC 201 execute the halftone processing of the color material usage data DA12 for the Na channels included in the next group G0.

When the halftone processing of all of the color material usage data DA12 has been performed, the printer 200 generates the raster data DA14 by performing rasterizing processing of sorting the halftone data DA13 in the order in which the dots are formed by the print engine 204 (S218). Subsequently, the printer 200 generates the drive signal SG1 shown in FIG. 2 from the raster data DA14 and then outputs the drive signal SG1 to the print engine 204 to thereby make the print engine 204 execute printing (S220), and then terminates the printer-side processing.

According to the above, when the identification information representing Nb>Na is included in the header HE1, the printer 200 makes the SoC 201 perform the extraction processing and the halftone processing on the compressed image data DA2 for the Na channels corresponding to each of the groups G0 included in the print command CMD1. On that basis, the printer 200 makes printing be executed based on the halftone data DA13 obtained. Therefore, in the present specific example, it is possible to generate the print command CMD1 from the original image data DA1 for the number of channels Nb which fails to fall within the processing unit of the SoC 201 which processes the compressed image data DA2 by the processing unit of the predetermined number of channels Na in the printer 200 without changing the SoC 201.

Further, when the identification information representing Nb=Na is included in the header HE1, the printer 200 makes the SoC 201 perform the extraction processing and the halftone processing on the compressed image data DA2 for the Na channels which is not grouped. On that basis, the printer 200 makes printing be executed based on the halftone data DA13 obtained. Therefore, in the present specific example, it is possible to generate the print command CMD1 from the second original image data DA4 for the number of channels Na which fall within the processing unit of the SoC 201, and thus, it is possible to make printing be executed.

(4) MODIFIED EXAMPLES

A variety of modified examples can be adopted in the present disclosure.

For example, the printer is not limited to a printer using ink as the color material, and can be an electrophotographic printer such as a laser printer using toner as the color material.

The first color material CM1 used by the printer 200 can be constituted by 4 types of color materials of C, M, Y, and K. In this case, the original image data corresponding to the process colors can be the color material usage data representing the usage of the color materials of C, M, Y, and K.

Further, the original image data DA1 can be halftone data on which the halftone processing has been performed. In this case, the SoC 201 is not required to have the halftone processing unit 212, and can be provided only with the extraction processing unit 211. By the print controller 202 making the extraction processing unit 211 which performs the predetermined processing of generating the halftone data DA13 as the image data DA3 by the processing unit for the Na channels from the compressed image data DA2 execute the predetermined processing, the present technology is applied.

(5) CONCLUSION

As described hereinabove, according to the present disclosure, in the variety of aspects, it is possible to provide a technology and so on which makes printing be executed from the original image data for the number of channels which fails to fall within the processing unit of the chip which processes the compressed image data by the processing unit of the predetermined number of channels in the printer without changing the chip. It is obvious that it is possible to obtain the basic functions and advantages described above with the technology constituted only by the constituents related to the independent claims in the appended claims.

Further, configurations obtained by replacing the constituents disclosed in the examples described above with each other, or modifying the combination thereof, configurations obtained by replacing the constituents disclosed in known technologies and the examples described above with each other, or modifying the combination thereof, and so on can also be implemented. The present disclosure includes these configurations and so on.

What is claimed is:

1. An information processing device to be coupled to a printer provided with a chip configured to generate image data to be printed by a processing unit of Na channels from compressed image data for the Na channels included in a print command defining the number of channels Na as an integer no smaller than 2, the information processing device comprising:
    a processing unit configured to divide original image data for a larger number of channels Nb than the number of channels Na into a plurality of groups so that a number of channels of each of the groups becomes no larger than the number of channels Na, generate compressed image data for the Na channels according to the processing unit from the original image data included in each of the groups, and generate the print command including the compressed image data for the Na channels corresponding to each of the groups; and
    a communication unit configured to transmit the print command to the printer.

2. The information processing device according to claim 1, wherein
    the number of channels Na is 4 which corresponds to process colors, and
    the number of channels Nb is no smaller than 5.

3. The information processing device according to claim 2, wherein
    the number of channels Nb is a number corresponding to the process colors and a special color, and
    the processing unit divides the original image data for the number of channels Nb into the plurality of groups so as to include a process color group for the 4 channels corresponding to the process colors, and at least one special color group corresponding to the special color.

4. The information processing device according to claim 3, wherein
    the printer uses a plurality of first color materials configured to express the process colors, and a second color material configured to express the special color,
    the image data includes first image data that is not color-separated corresponding to the process color group, and second image data which corresponds to the special color group, and which represents a usage of the second color material,
    the printer receives correspondence relation information representing a correspondence relationship between a usage of the process color and a usage of the plurality of first color materials, and color-separates the first image data into data representing the usage of the plurality of first color materials in accordance with the correspondence relation information, and
    the processing unit generates the print command including the compressed image data for the Na channels corresponding to each of the groups, and the correspondence relation information.

5. The information processing device according to claim 1, wherein
    when the number of channels Nb is not an integral multiple of the number of channels Na, the processing unit adds dummy data to the group including the original image data smaller in number of channels than the number of channels Na out of the plurality of groups so that the number of channels becomes the number of channels Na, and then generates the compressed image data for the Na channels.

6. The information processing device according to claim 1, wherein
    when identification information representing that compressed image data for the Na channels corresponding to each of the groups is included in a header included in the print command, the printer makes the chip execute processing of generating the image data by processing unit of the Na channels from the compressed image data for the Na channels corresponding to each of the groups included in the print command, and
    the processing unit
    generates the print command including the compressed image data for the Na channels according to the processing unit from second original image data for the number of channels Na, and
    provides the header of the print command with the identification information when generating the compressed image data for the Na channels corresponding to each of the groups from the original image data for the number of channels Nb.

7. A non-transitory computer-readable storage medium storing a print control program configured to transmit a print command to a printer provided with a chip configured to generate image data to be printed by a processing unit of Na channels from compressed image data for the Na channels included in the print command defining the number of channels Na as an integer no smaller than 2, the program making a computer realize functions comprising:

a compressed image data generation function of dividing original image data for a larger number of channels Nb than the number of channels Na into a plurality of groups so that a number of channels of each of the groups becomes no larger than the number of channels Na to generate compressed image data for the Na channels according to the processing unit from the original image data included in each of the groups; and     a print command generation function of generating the print command including the compressed image data for the Na channels corresponding to each of the groups.

8. A printing system comprising:

a printer; and an information processing device, wherein the printer includes a receiver configured to receive a print command, a chip configured to perform predetermined processing of generating image data to be printed by a processing unit of Na channels from compressed image data for the Na channels defining the number of channels Na as an integer no smaller than 2, and a print controller configured to make the chip perform the predetermined processing on the compressed image data for the Na channels corresponding to each of the plurality of groups included in the print command to execute printing based on the image data obtained, and the information processing device includes a processing unit configured to divide original image data for a larger number of channels Nb than the number of channels Na into the plurality of groups so that a number of channels of each of the groups becomes no larger than the number of channels Na, generate the compressed image data for the Na channels according to the processing unit from the original image data included in each of the groups, and generate the print command including the compressed image data for the Na channels corresponding to each of the groups, and a communication unit configured to transmit the print command to the printer.

\* \* \* \* \*